(12) United States Patent
Kane et al.

(10) Patent No.: US 8,432,479 B2
(45) Date of Patent: Apr. 30, 2013

(54) RANGE MEASUREMENT USING A ZOOM CAMERA

(75) Inventors: Paul J. Kane, Rochester, NY (US); Sen Wang, Rochester, NY (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 12/770,830

(22) Filed: Apr. 30, 2010

(65) Prior Publication Data

US 2011/0267507 A1    Nov. 3, 2011

(51) Int. Cl.
*H04N 5/225* (2006.01)
*G03B 13/00* (2006.01)

(52) U.S. Cl.
USPC ........... 348/362; 348/252; 348/335; 396/138; 396/505; 382/106

(58) Field of Classification Search ........................ None
See application file for complete search history.

(56) References Cited

U.S. PATENT DOCUMENTS

| | | | | |
|---|---|---|---|---|
| 8,017,899 B2* | 9/2011 | Levenets et al. | ........... | 250/208.1 |
| 2002/0075990 A1* | 6/2002 | Lanza et al. | ...................... | 378/2 |
| 2005/0030625 A1* | 2/2005 | Cattin-Liebl | ................. | 359/560 |
| 2006/0157640 A1* | 7/2006 | Perlman et al. | ............ | 250/208.1 |
| 2009/0016481 A1* | 1/2009 | Slinger | .............................. | 378/2 |
| 2009/0020714 A1* | 1/2009 | Slinger | ......................... | 250/550 |
| 2009/0028451 A1 | 1/2009 | Slinger et al. | | |
| 2009/0090868 A1* | 4/2009 | Payne | ..................... | 250/363.06 |
| 2009/0091633 A1* | 4/2009 | Tamaru | .................... | 348/208.14 |
| 2010/0110179 A1* | 5/2010 | Zalevsky et al. | ............. | 348/135 |
| 2010/0220212 A1* | 9/2010 | Perlman et al. | ............ | 348/229.1 |

OTHER PUBLICATIONS

Sazbon, D., et al. "Qualitative Real-Time Range Extraction for Preplanned Scene Partitioning Using Laser Beam Coding," Apr. 29, 2005, Pattern Recognition Letters, vol. 26, 2005.*
Hiura, S., et al. "Depth Measurement by the Multi-Focus Camera," Jun. 23, 1998, 1998 IEEE Computer Society Conference on Computer Vision and Pattern Recognition, p. 953-959.*
A.N. Rajagopalan et al.: "An MRF Model-Based Approach to Simultaneous Recovery of Depth and Restoration From Defocused Images", IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 10.1109/34.777369, the whole document.
V.M. Bove, Pictorial Applications for Range Sensing Cameras, SPIE vol. 901, pp. 10-17, 1988.
J.W. Goodman, Introduction to Fourier Optics, MCGraw-Hill, San Francisco, 1968, pp. 113-117.
Veeraraghaven et al, Dappled Photography: Mask Enhanced Cameras for heterodyned Light Fields and Coded Aperture refocusing, ACM Transactions on graphics 26 (3), Jul. 2007, paper 69.
Levin et al, Image and Depth from a Conventional camera with a Coded Aperture, ACM Transactions on Graphics 26 (3), Jul. 2007, paper 70.
Dr. Arthur Cox, A Survey of Zoom Lenses, SPIE vol. 3129,0277-786x/97, Sep. 25, 1997.

* cited by examiner

*Primary Examiner* — Chieh M Fan
*Assistant Examiner* — Dwight C Tejano
(74) *Attorney, Agent, or Firm* — Wong, Cabello, Lutsch, Rutherford & Brucculeri LLP

(57) ABSTRACT

A method of using an image capture device to identify range information for objects in a scene, includes providing an image capture device having at least one image sensor, a lens and a coded aperture, storing in a memory a set of blur kernels derived from range calibration data for the coded aperture, capturing a first and second image of the scene having a plurality of objects, corresponding to first and second optical magnifications, respectively. The method further includes providing a set of deblurred images using the capture images from each magnification and each of the blur kernels from the stored set, and using the set of deblurred images to determine the range information for the objects in the scene.

18 Claims, 14 Drawing Sheets

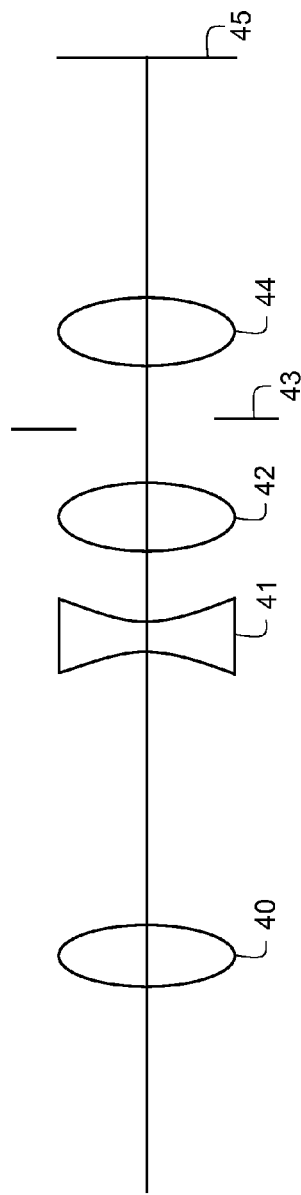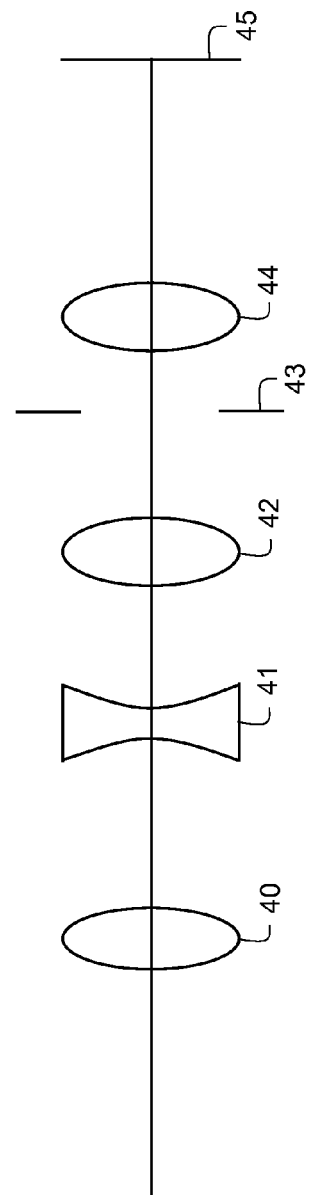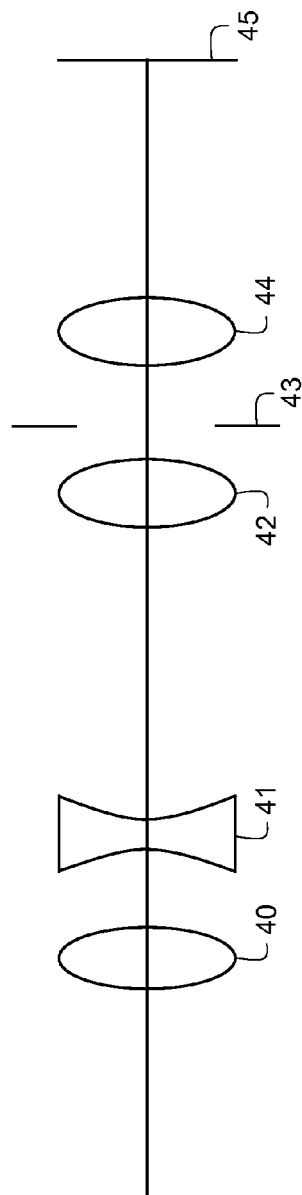

FIG. 11

RANGE MEASUREMENT USING A ZOOM CAMERA

CROSS REFERENCE TO RELATED APPLICATIONS

Reference is made to commonly assigned, co-pending U.S. patent application Ser. No. 12/612,135, filed Nov. 4, 2009, entitled "image deblurring using a combined differential image", by Sen Weng, et al, co-pending U.S. patent application Ser. No. 12/770,810, filed concurrently herewith and entitled "Range measurement using coded aperture", by Paul J. Kane, et al, co-pending U.S. patent application Ser. No. 12/770,822 filed concurrently herewith and entitled "Range measurement using multiple coded apertures", by Paul J. Kane, et al, co-pending U.S. patent application Ser. No. 12/770,894, filed concurrently herewith and entitled "Digital camera with coded aperture rangefinder", by Paul J. Kane, et al, and co-pending U.S. patent application Ser. No. 12/770,919, filed concurrently herewith and entitled "Range measurement using symmetric coded apertures", by Paul J. Kane, et al, all of which are incorporated herein by reference.

FIELD OF THE INVENTION

The present invention relates to an image capture device that is capable of determining range information for objects in a scene, and in particular a capture device that uses a coded aperture, optical magnification, and computational algorithms to efficiently determine the range information.

BACKGROUND OF THE INVENTION

Optical imaging systems are designed to create a focused image of scene objects over a specified range of distances. The image is in sharpest focus in a two dimensional (2D) plane in the image space, called the focal or image plane. From geometrical optics, a perfect focal relationship between a scene object and the image plane exists only for combinations of object and image distances that obey the thin lens equation:

$$\frac{1}{f} = \frac{1}{s} + \frac{1}{s'} \quad (1)$$

where f is the focal length of the lens, s is the distance from the object to the lens, and s' is the distance from the lens to the image plane. This equation holds for a single thin lens, but it is well known that thick lenses, compound lenses and more complex optical systems are modeled as a single thin lens with an effective focal length f. Alternatively, complex systems are modeled using the construct of principal planes, with the object and image distances s, s' measured from these planes, and using the effective focal length in the above equation, hereafter referred to as the lens equation.

It is also known that once a system is focused on an object at distance $s_1$, in general only objects at this distance are in sharp focus at the corresponding image plane located at distance $s_1'$. An object at a different distance $s_2$, produces its sharpest image at the corresponding image distance $s_2'$, determined by the lens equation. If the system is focused at $s_1$, an object at $s_2$ produces a defocused, blurred image at the image plane located at $s_1'$. The degree of blur depends on the difference between the two object distances, $s_1$ and $s_2$, the focal length of the lens, and the aperture of the lens as measured by the f-number, denoted f/#. For example, FIG. 1 shows a single lens 10 of focal length f and clear aperture of diameter D. The on-axis point $P_1$ of an object located at distance $s_1$ is imaged at point $P_1'$ at distance $s_1'$ from the lens. The on-axis point $P_2$ of an object located at distance $s_2$ is imaged at point $P_2'$ at distance SI from the lens 10. Tracing rays from these object points, axial rays 20 and 22 converge on image point $P_1'$, whereas axial rays 24 and 26 converge on image point $P_2'$, then intercept the image plane of $P_1'$ where they are separated by a distance d. In an optical system with circular symmetry, the distribution of rays emanating from $P_2$ over all directions results in a circle of diameter d at the image plane of $P_1'$, which is called the blur circle or circle of confusion.

On-axis point $P_1$ moves farther from the lens, tending towards infinity, it is clear from the lens equation that $s_1'=f$. This leads to the usual definition of the f-number as f/#=f/D. At finite distances, the working f-number is defined as $(f/\#)_w = f/s_1'$. In either case, it is clear that the f-number is an angular measure of the cone of light reaching the image plane, which in turn is related to the diameter of the blur circle d. In fact, it is shown that $$d = \frac{f}{(f/\#)s_2'}|s_2' - s_1'|. \quad (2)$$

By accurate measure of the focal length and f-number of a lens and the diameter d of the blur circle for various objects in a two dimensional image plane, depth information is obtained for objects in the scene by inverting the Eq. (2), and applying the lens equation to relate the object and image distances. This requires careful calibration of the optical system at one or more known object distances, at which point the remaining task is the accurate determination of the blur circle diameter d.

The above discussion establishes the basic principles behind passive optical ranging methods based on focus. That is, methods based on existing illumination (passive) that analyze the degree of focus of scene objects, and relate this to their distance from the camera. Such methods are divided into two categories: depth from defocus methods assume that the camera is focused once, and that a single image is captured and analyzed for depth, whereas depth from focus methods assume that multiple images are captured at different focus positions, and the parameters of the different camera settings are used to infer the depth of scene objects.

The method presented above provides insight into the problem of depth recovery, but unfortunately is oversimplified and not robust in practice. Based on geometrical optics, it predicts that the out-of-focus image of each object point is a uniform circular disk or blur circle. In practice, diffraction effects and lens aberrations lead to a more complicated light distribution, characterized by a point spread function (psf), specifying the intensity of the light at any point (x,y) in the image plane due to a point light source in the object plane. As explained by Bove (V. M. Bove, *Pictorial Applications for Range Sensing Cameras*. SPIE vol. 901, pp. 10-17, 1988), the defocusing process is more accurately modeled as a convolution of the image intensities with depth-dependent psf:

$$i_{def}(x,y;z) = i(x,y) * h(x,y;z), \quad (3)$$

where $i_{def}(x,y;z)$ is the defocused image, $i(x,y)$ is the in-focus image, $h(x,y;z)$ is the depth-dependent psf and * denotes convolution. In the Fourier domain, this is written:

$$I_{def}(v_x,v_y) = I(v_x,v_y;z), \quad (4)$$

where $I_{def}(v_x, v_y)$ is the Fourier transform of the defocused image, $I(v_x, v_y)$ is the Fourier transform of the in-focus image, and $H(v_x, v_y, z)$ is the Fourier transform of the depth-dependent psf. Note that the Fourier Transform of the psf is the Optical Transfer Function, or OTF. Bove describes a depth-from-focus method, in which it is assumed that the psf is circularly symmetric, i.e. $h(x,v;z)=h(r;z)$ and $H(v_x,v_y;z)=(\rho;z)$, where r and $\rho$ are radii in the spatial and spatial frequency domains, respectively. Two images are captured, one with a small camera aperture (long depth of focus) and one with a large camera aperture (small depth of focus). The Discrete Fourier Transform (DFT) is taken of corresponding windowed blocks in the two images, followed by a radial average of the resulting power spectra, meaning that an average value of the spectrum is computed at a series of radial distances from the origin in frequency space, over the 360 degree angle. At that point the radially averaged power spectra of the long and short depth of field (DOF) images are used to compute an estimate for $H(\rho,z)$ at corresponding windowed blocks, assuming that each block represents a scene element at a different distance z from the camera. The system is calibrated using a scene containing objects at known distances [$z_1$, $z_2$, ... $z_n$] to characterize $H(\rho;z)$, which then is related to the blur circle diameter. A regression of the blur circle diameter vs. distance z then leads to a depth or range map fir the image, with a resolution corresponding to the size of the blocks chosen for the DFT Methods based on blur circle regression have been shown to produce reliable depth estimates. Depth resolution is limited by the fact that the blur circle diameter changes rapidly near focus, but very slowly away from focus, and the behavior is asymmetric with respect to the focal position. Also, despite the fact that the method is based on analysis of the point spread function, it relies on a single metric (blur circle diameter) derived from the psf.

Other depth from defocus methods seek to engineer the behavior of the psf as a function of defocus in a predictable way. By producing a controlled depth-dependent blurring function, this information is used to deblur the image and infer the depth of scene objects based on the results of the deblurring operations. There are two main parts to this problem: the control of the psf behavior, and deblurring of the image, given the psf as a function of defocus.

The psf behavior is controlled by placing a mask into the optical system, typically at the plane of the aperture stop. For example, FIG. 2 shows a schematic of an optical system from the prior art with two lenses 30 and 34, and a binary transmittance mask 32 including an array of holes, placed in between. In most cases, the mask is the element in the system that limits the bundle of light rays that propagate from an axial object point, and is therefore by definition the aperture stop. If the lenses are reasonably free from aberrations, the mask, combined with defocus effects, will largely determine the psf and OTF (see J. W. Goodman, *Introduction to Fourier Optics*, McGraw-Hill, San Francisco, 1968, pp. 113-117). This observation is the working principle behind the encoded blur or Coded aperture methods. In one example of the prior art, Veeraraghavan et al. (*Dappled Photography: Mask Enhanced Cameras, for Heterodyned Light Fields and Coded Aperture Refocusing*, ACM Transactions on Graphics 26 (3), July 2007, paper 69) demonstrate that a broadband frequency mask composed of square, uniformly transmitting cells can preserve high spatial frequencies during defocus blurring. By assuming that the defocus psf is a scaled version of the aperture mask, a valid assumption when diffraction effects are negligible, the authors show that depth information is obtained by deblurring. This requires solving the deconvolution problem, i.e. inverting Eq. (3) to obtain h(x,y;z) for the relevant values of z. In principle, it is easier to invert the spatial frequency domain counterpart of this equation, namely Eq. (4) which is done at frequencies for which $H(v_x, v_y,z)$ is nonzero.

In practice, finding a unique solution for deconvolution is well known as a challenging problem. Veeraraghavan et al solve the problem by first assuming the scene is composed of discrete depth layers, and then forming an estimate of the number of layers in the scene. Then, the scale of the psf is estimated for each layer separately, using the model $$h(x,y,z)=m(k(z)x/w,k(z)y/w), \quad (5)$$

where m(x,y) is the mask transmittance function, k(z) is the number of pixels in the psf at depth z, and w is the number of cells in the 2D mask. The authors apply a model for the distribution of image gradients, along with Eq. (5) for the psf, to deconvolve the image once for each assumed depth layer in the scene. The results of the deconvolutions are desirable only for those psfs whose scale they match, thereby indicating the corresponding depth of the region. These results are limited in scope to systems behaving according to the mask scaling model of Eq. (5), and masks composed of uniform, square cells.

Levin et al (*Image and Depth from a Conventional Camera with a Coded Aperture*, ACM Transactions on Graphics 26 (3), July 2007, paper 70) follow a similar approach to Veeraraghavan, however, Levin et al rely on direct photography of a test pattern at a series of defocused image planes, to infer the psf as a function of defocus, Also, Levin et al investigated a number of different mask designs in an attempt to arrive at an optimum coded aperture. They assume a Gaussian distribution of sparse image gradients, along with a Gaussian noise model, in their deconvolution algorithm. Therefore, the coded aperture solution is dependent on assumptions made in the deconvolution analysis.

SUMMARY OF THE INVENTION

The present invention represents a method of using an image capture device to identify range information for objects in a scene, comprising:

a) providing an image capture device having at least one image sensor, a lens and a coded aperture;

b) storing in a memory a set of blur kernels derived from range calibration data for the coded aperture;

c) capturing a first and second image of the scene having a plurality of objects, corresponding to first and second optical magnifications, respectively;

d) providing a set of deblurred images using the capture images from each magnification and each of the blur kernels from the stored set; and e) using the set of deblurred images to determine the range information for the objects in the scene.

This invention has the advantage that it produces range estimates based on multiple captures with different spatial frequency responses, using a single coded aperture and a zoom lens. Many digital cameras already include zoom lenses, which when combined with the present invention permits the use of a single coded aperture with the improved accuracy of multiple captures for determination of range information.

BRIEF DESCRIPTION OF THE DRAWINGS

FIGS. 5a-5c show schematics of a mechanically compensated zoom lens system known in the prior art.

FIG. 11 is a schematic showing an array of indices centered on a current pixel location according to one embodiment of the present invention.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein, are selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
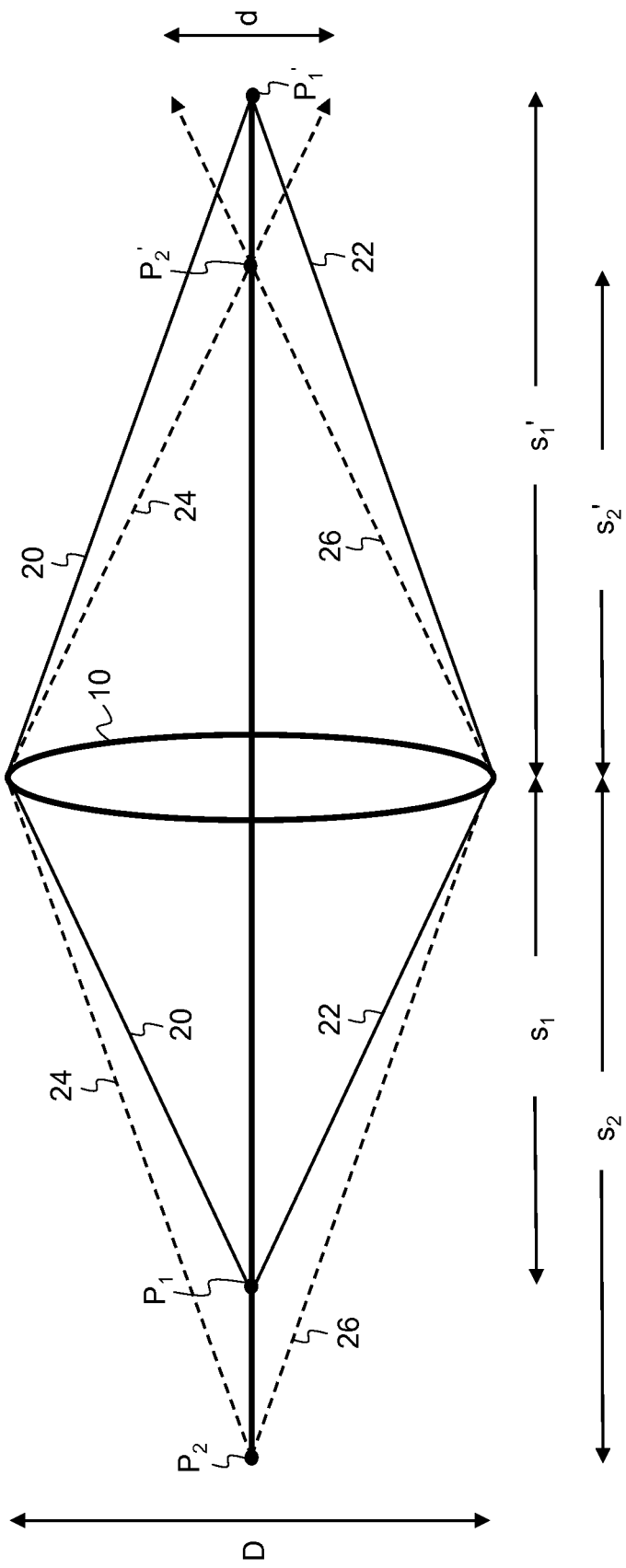
FIG. 1 is a schematic of a single lens optical system as known in the prior art.
Figure 2:
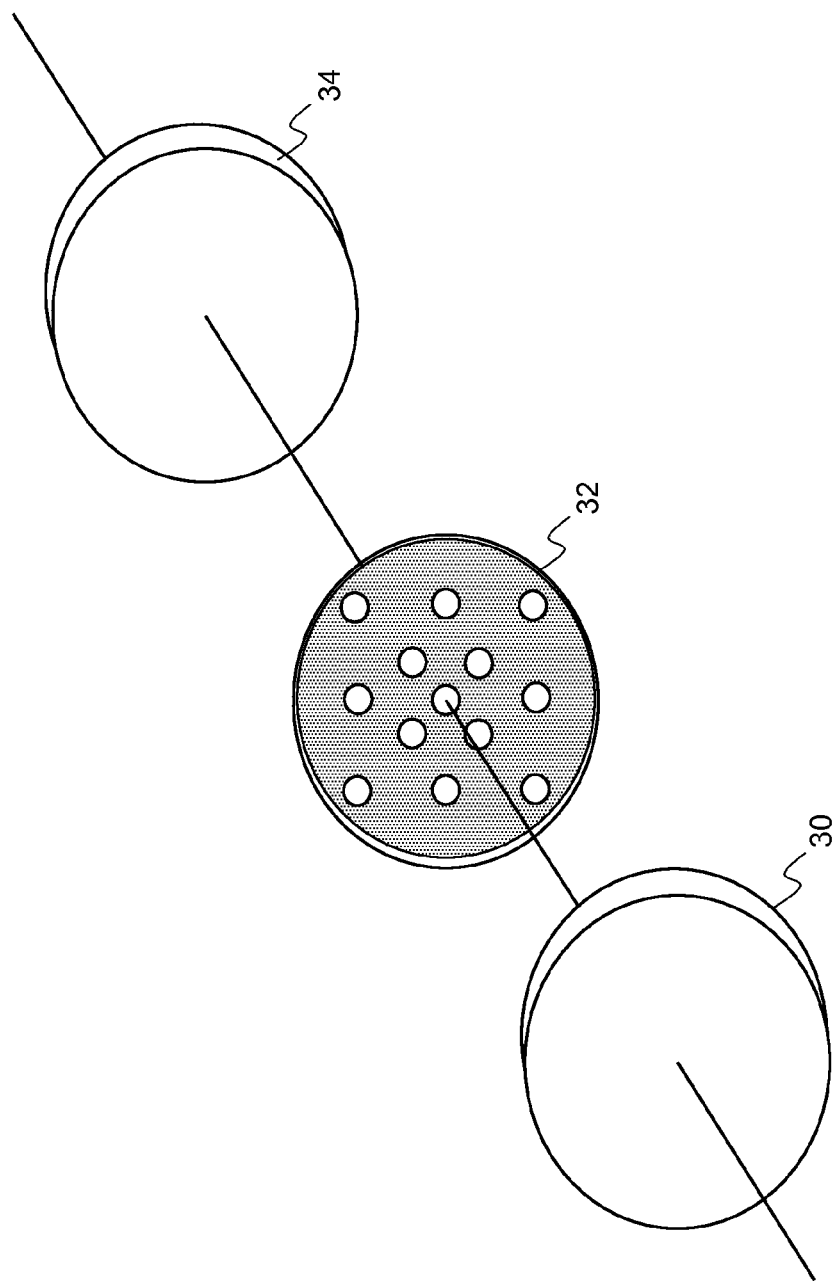
FIG. 2 is a schematic of an optical system with a coded aperture mask as known in the prior art.
Figure 3:
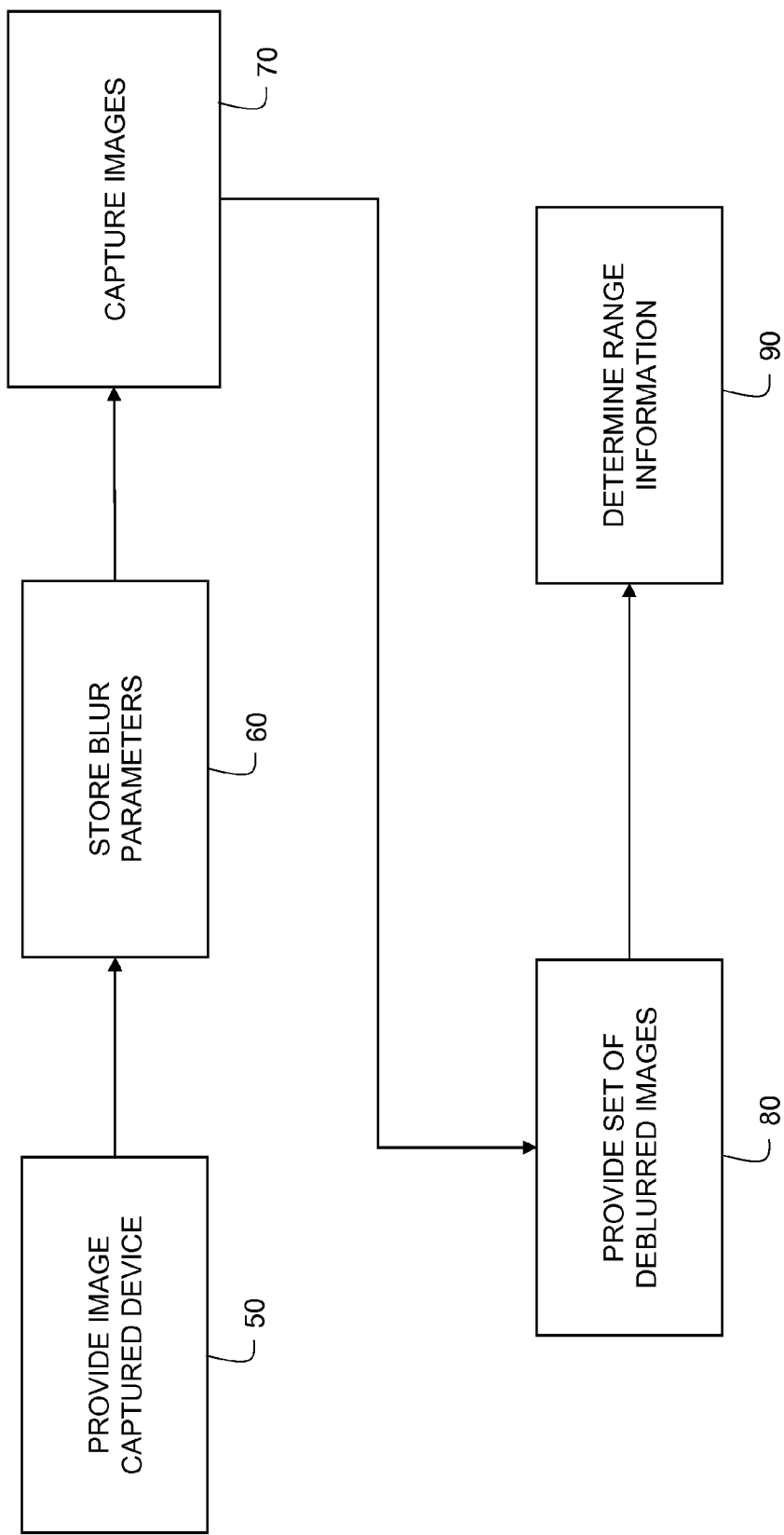
FIG. 3 is a flowchart showing the steps of a method for using an image capture device to identify range information for objects in a scene according to one embodiment of the present invention.

FIG. 3 is a flow chart showing the steps of a method of using an image capture device to identify range information for objects in a scene according to an embodiment of the present invention. The method includes the steps of: providing an image capture device 50 having at least one image sensor, a lens and a coded aperture; storing in a memory 60 a set of blur parameters derived from range calibration data for each coded aperture; capturing a first and second image of the scene 70 having a plurality of objects, corresponding to first and second optical magnifications, respectively, providing a set of deblurred images 80 using the capture image and each of the blur parameters from the stored set; and using the set of blurred images to determine the range information 90 for objects in the scene.

An image capture device includes one or more image capture devices that implement the methods of the various embodiments of the present invention, including the example image capture devices described herein. The phrases "image capture device" or "capture device" are intended to include any device including a lens which forms a focused image of a scene at an image plane, wherein the device is capable of forming the focused image of the scene at the image plane using two or more object-image distance pairings, so that the optical magnification between the scene and the image is selectable. The phrases "image capture device" or "capture device" further include an electronic image sensor located at the image plane for the purposes of recording and digitizing the image, and a coded aperture or mask located between the scene or object plane and the image plane. These include a digital camera, cellular phone, digital video camera, surveillance camera, web camera, television camera, multimedia device, or any other device for recording images.

Figure 4:
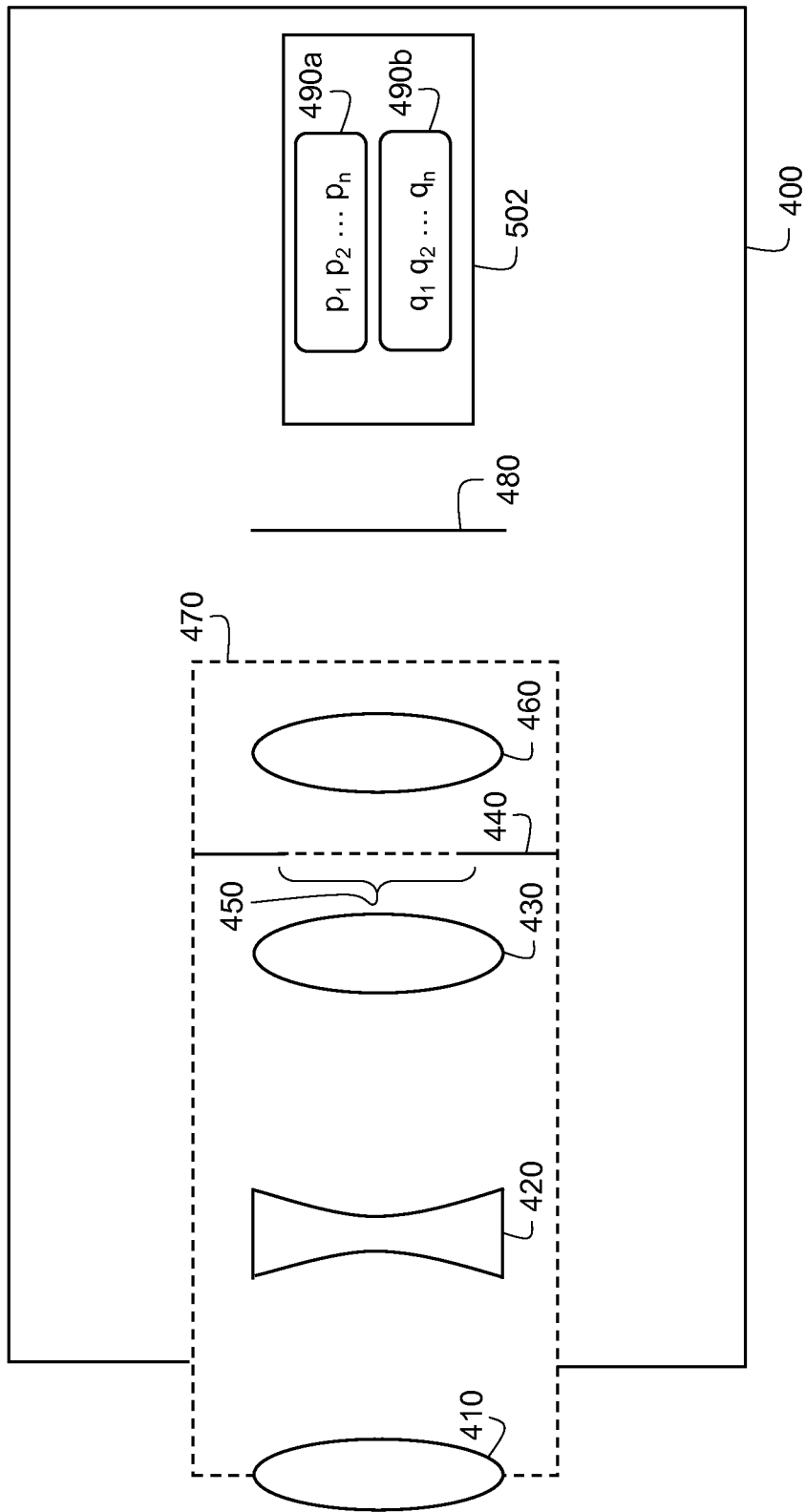
FIG. 4 is a schematic of a capture device according to one embodiment of the present invention.

FIG. 4 is a schematic diagram of one such capture device according to one embodiment of the present invention. The capture device 400 includes a zoom lens 470, used to capture first and second images of a scene having a plurality of objects, corresponding to first and second optical magnifications, respectively. A zoom lens is defined as a lens system whose focal length is variable, while its image plane remains fixed. The zoom lens 470 further includes a coded aperture 450 located at the aperture stop 440. The zoom lens 470 is a compound lens that includes a focus unit 410, a variator 420, a compensator 430 and a prime or relay lens 460. The zoom lens 470 shown in FIG. 4 is an example of a mechanically compensated zoom lens. As explained by Cox (A. Cox, *A Survey of Zoom Lenses*, SPIE vol. 3129, 2-12, 1997), the focus unit 410 provides an image plane in a fixed position, the variator 420 combines with the focus unit to provide a subsystem of varying focal length, whose image plane depends on the focal length, the compensator 430 corrects for the change of image plane introduced by the variator, and the prime lens 460 forms the final image. The capture device further includes an electronic sensor array 480, located at the image plane, and a memory 502 for storing blur parameters 490a, 490b, both of which will be described in further detail later.

FIGS. 5a-5c show schematic diagrams of a mechanically compensated zoom lens known in the prior art which are used in the present invention. In FIGS. 5a-5c, the elements are focus unit 40, variator 41, compensator 42, aperture stop 43, prime lens 44 and image plane 45. Before setting the image zoom or magnification, the lens is focused on an object of interest. In FIG. 5a, the variator 41 and compensator 42 are moved to the right, towards the aperture stop 43, resulting in a long focal length. This is termed the telephoto position, and has the effect of magnifying distant objects. In FIG. 5b, the variator 41 is moved towards the left and the compensator 42 is moved slightly to the left, away from the aperture stop 43, resulting in a shorter focal length. This is termed the mid range position and creates images that have similar perspective to the naked eye view. In FIG. 5c, the variator 41 is moved further to the left, away from the aperture stop 43, while the compensator 42 is moved to the right, towards the aperture stop 43, resulting in a short focal length. This is termed the wide angle position, and has the effect of capturing a wide field of view. In focal length configurations, only the variator 41 and compensator 42 change position; all other components are fixed.

Figure 6A:
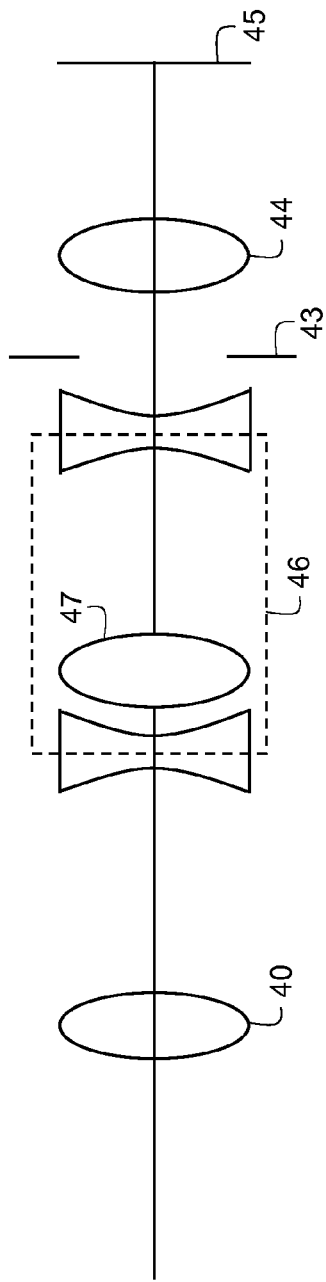
FIGS. 6a-6c show schematics of an optically compensated zoom lens system as known in the prior art.
Figure 6B:
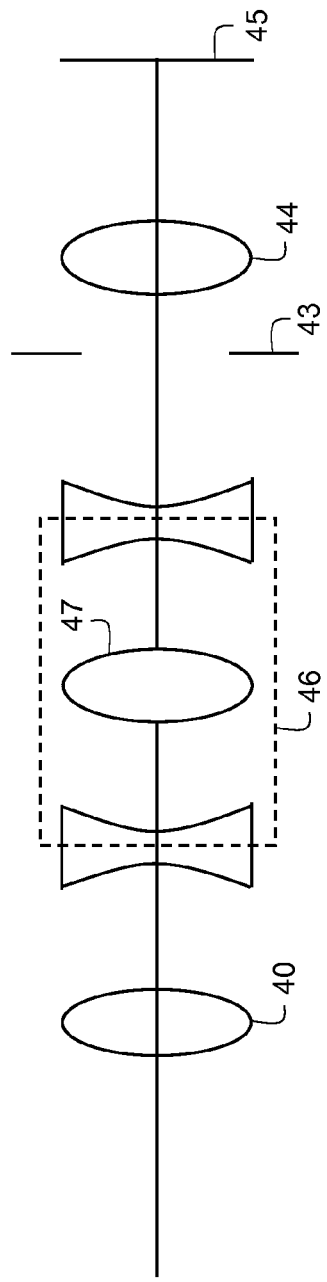
Figure 6C:
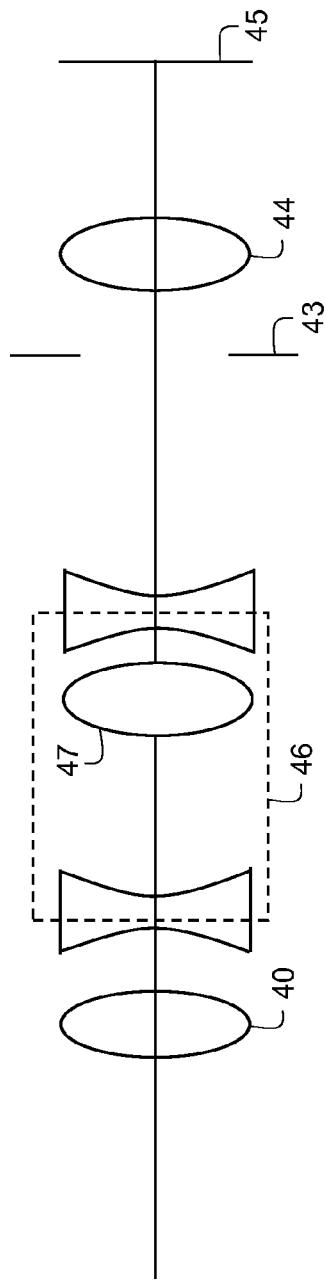

FIGS. 6a-6c show an alternate arrangement of a zoom lens that is used in the present invention. In this arrangement, termed an optically compensated zoom lens, the actions of the variator and compensator are accomplished by a Variator Compensator Joint (VCJ) roup 46. The VCJ group 46 moves between positions that are closer to the aperture stop 43 (FIG. 6a, telephoto), midway between the aperture stop 43 and the focus unit 40 (FIG. 6b, mid range), and closer to the focus unit 40 (FIG. 6c, wide angle). Many VCJ designs include a central lens that remains fixed, about which the other elements move during zooming, shown as central lens element 47 in FIGS. 6a-6c.

Returning to FIG. 4, the element in the system that limits the bundle of light rays propagating from an axial object point is defined as the aperture stop. Preferably, the coded aperture 450 is located at the normal aperture stop 440 of the lens system. In a properly designed zoom lens, the plane of the aperture stop remains fixed during zooming. In alternate arrangements, the coded aperture 450 is located at one of the images of the aperture stop, known in the art as the entrance and exit pupils. During zooming, the locations of the pupil images can change due to the movement of intervening optical elements. In these arrangements, the coded aperture is moved to coincide with the pupil images. The coded aperture 450 is of the light absorbing type, so as to alter only the amplitude distribution across the optical wavefronts incident upon it, or the phase type, so as to alter only the phase delay across the optical wavefronts incident upon it, or of mixed type, so as to alter both the amplitude and phase.

Figure 7A:
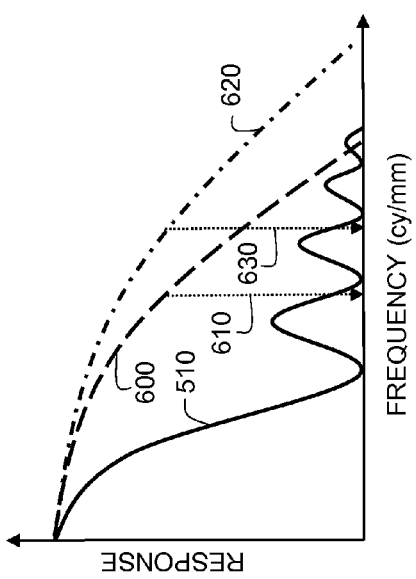
FIGS. 7a-7d are a series of graphs illustrating the scaling of spatial frequency spectra at different zoom and defocus conditions.
Figure 7B:
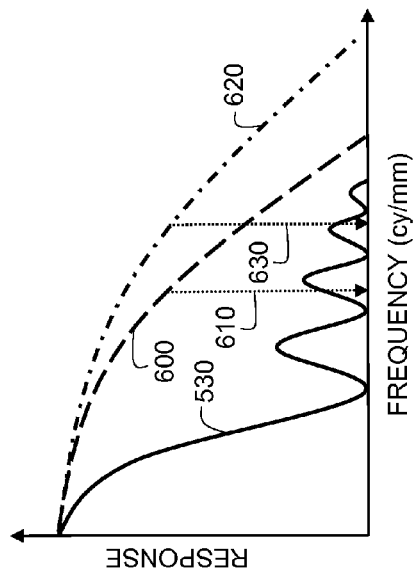
Figure 7C:
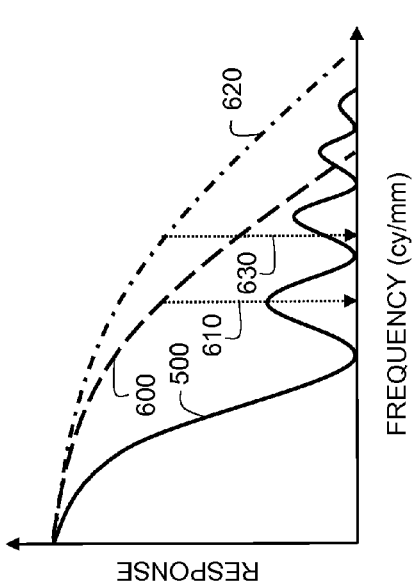

The purpose of capturing first and second images of a scene, corresponding to first and second optical magnifications, is to provide multiple captures of various scene objects, using different spatial frequency responses relative to the spatial frequency content of the objects. As the scale of the detail in scene objects changes with magnification, the scale of the objects' frequency content changes with magnification. In the two captures at the two different magnifications, the objects' frequency content is filtered by the capture device's frequency response at the two different magnifications, and at a different scale. This is illustrated in FIGS. 7a-7d, which shows four schematic spatial frequency plots in accordance with the present invention. In FIG. 7a, curve 500 represents the response of a capture device with a coded aperture mask at optical magnification $m_1$. As discussed by Levin et al, when the lens is well-corrected, the coded aperture mask and the defocus aberration dominate the modulation transfer function (MTF) of the capture device. The resulting MTF for a mask with a binary transmittance pattern typically includes a central low-pass region, followed by a series of oscillations of decreasing amplitude. Also shown in FIG. 7a is a model Fourier spectrum 600 of a scene object at optical magnification $m_1$. The (modulus of) the Fourier spectrum of this scene object after capture (not shown) is approximated by multiplication of curves 500 and 600 on a frequency-by-frequency basis. If the capture device is then used at a second optical magnification $m_2$, the effective Fourier spectrum of the same scene object prior to capture is represented by curve 620, which is equivalent to the original spectrum scaled along the spatial frequency axis. It is clear from FIG. 7a that the captured spectrum of this scene object, when multiplied by curve 500, will result in a different cascaded curve. In using the curve 500 along with curves 600 and 620, which represent two different optical magnifications, we make the approximation that the MTF of the capture device is independent of optical magnification. Although the optical aberrations of zoom lenses vary with magnification, this is still an effective approximation for well-corrected zoom lenses with a coded aperture. To further illustrate the effect of the optical magnification difference on the captured scene spectrum, lines 610 and 630 show a particular response point on the scene spectrum curve at the two magnifications, and indicate the different corresponding points on the capture device response curve that affect this frequency at each magnification.

Figure 7D:
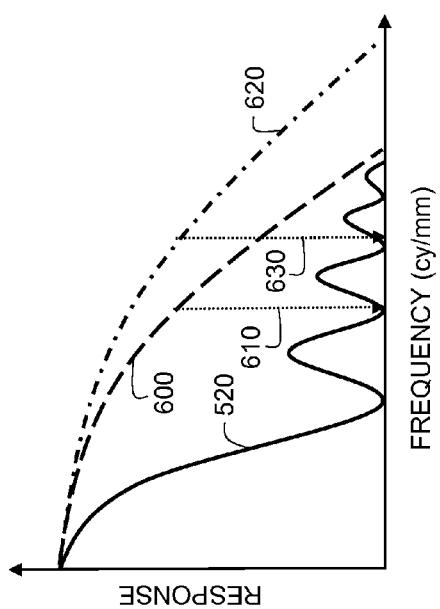

In the Background, the blur circle arising from defocus was discussed. Naturally, the blur circle grows larger with increasing defocus, and similarly, the psf of any optical system tends to grow larger in size with increasing defocus. In the spatial frequency domain, the corresponding MTF decreases in extent, as higher spatial frequencies are lost with increasing defocus. This is illustrated in FIGS. 7a-7d, wherein curves 500, 510, 520 and 530 represent a defocus MTF series for a capture system which includes a coded aperture. FIG. 7a represents an improved focus position, whereas FIG. 7d represents the position of largest defocus. If the capture system MTF is dominated by the coded aperture mask, the psi will scale with increasing defocus and the MTF will approximately scale in an inverse fashion, as shown in the progression of figures. The scene object spectra 600 and 620 at the two magnifications are shown in each plot for reference. Also shown are the lines 610 and 630 that illustrate how the points on the scene spectrum are mapped through unique points on the capture system response curve, depending on the magnification and amount of defocus. This diversity of information is useful in the present invention to efficiently determine the range of scene objects.

In the preferred embodiment, the amount of magnification difference between the two image captures need only be large enough to create a significant difference in the cascade of the scene spectrum and the capture device MTF. For example, examining FIG. 7a, it is clear that the effect of the magnification difference on the spatial frequency indicated by lines 610 and 630 is to move the response at that frequency from a secondary maximum to a near minimum. This is accomplished with a moderate (m<2×) change in magnification. In the preferred embodiment, the magnification difference will be chosen in the range $1.1 \times \leq m \leq 1.5 \times$. In other embodiments, larger magnification changes are used. However, larger magnifications can cause other differences between the images, such as aberrations or brightness, that need to be corrected. At extreme differences, some scene objects can be excluded from the field of view.

Returning to FIG. 3, the step of storing in a memory a set of blur parameters 60 refers to storing a representation of the psf of the image capture device for a series of object distances and defocus distances. Storing the blur parameters includes storing a digitized representation of the psf, specified by discrete code values in a two dimensional matrix. It also includes storing mathematical parameters derived from a regression or fitting function that has been applied to the psf data, such that the psf values for a given (x,y,z) location are readily computed from the parameters and the known regression or fitting function. Such memory can include computer disk, ROM, RAM or any other electronic memory known in the art. Such memory can reside inside the camera, or in a computer or other device electronically linked to the camera. In the embodiment shown in FIG. 4, the memory 502 storing blur parameters 490a, i.e. $[p_1, p_2, \ldots p_n]$, for the first magnification and blur parameters 490b, i.e. $[q_1, q_2, \ldots q_n]$, for the second magnification is located inside the capture device 400.

Figure 8:
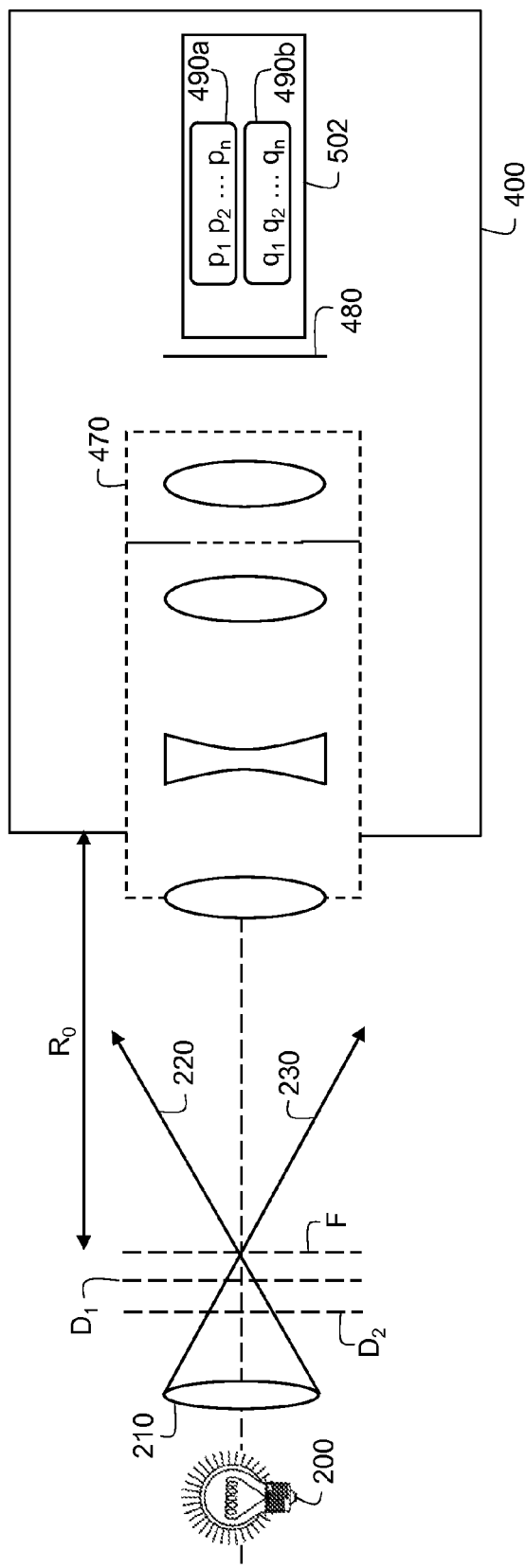
FIG. 8 is a schematic of a laboratory setup for obtaining blur parameters for one object distance and a series of defocus distances according to one embodiment of the present invention.

FIG. 8 is a schematic of a laboratory setup for obtaining blur parameters for one object distance, one optical magnification and a series of defocus distances in accord with the present invention. A simulated point source including a light source 200 is focused by condenser optics 210 at a point on the optical axis intersected by the focal plane F, which is also the plane of focus of the capture device 400, located at object distance $R_0$ from the camera. The light rays 220 and 230 passing through the point of focus appear to emanate from a point source located on the optical axis at distance $R_0$ from the capture device 400. With the capture device 400 set to the first optical magnification, an image of this light is captured by the capture device 400, thus recording the psf at object distance $R_0$. The defocused psf for objects at other distances is captured by moving the light source 200 and condenser lens 210 (in this example, to the left) together so as to move the location of the effective point source to other planes, for example $D_1$ and $D_2$, while maintaining the focus position at plane F. The distances (or range data) from the capture device 400 to planes F, $D_1$ and $D_2$ are then recorded along with the psf images to complete the first set of range calibration data. The process is repeated for the second optical magnification to complete the second set of range calibration data. It will be apparent to those skilled in the art that the process of obtaining blur parameters is repeated not only for a set of magnifications of interest, but also for a set of object distances of interest, and that the resulting data is stored in the capture device memory. It will also be apparent that the capture device is characterized for a large number of magnification and object distance settings, or a small number of settings, depending on the intended use of the device.

Returning to FIG. 3, the step of capturing an image of the scene 50 includes capturing two images of the scene, with first and second optical magnifications, or two digital image sequences, also known in the art as motion or video sequences, one image sequence for each of the first and second magnifications. In this way the method includes the ability to identify range information for one or more moving objects in a scene. This is accomplished by determining range information 90 for each image in the sequence, or by determining range information 90 for some subset of images in the sequence. In some arrangements, a subset of images in the sequence is used to determine range information 90 for one or more moving objects in the scene, as long as the time interval between the images chosen is sufficiently small to resolve significant changes in the depth or z-direction. That is, this will be a function of the objects' speed in the z-direction and the original image capture interval, or frame rate. In other arrangements, the determination of range information for one or more moving objects in the scene is used to identify stationary and moving objects in the scene. This is especially advantageous if the moving objects have a z-component to their motion vector, i.e. their depth changes with time, or image frame. Stationary objects are identified as those objects for which the computed range values are unchanged with time after accounting for motion of the camera, whereas moving objects have range values that can change with time. In yet another arrangement, the range information associated with moving objects is used by an image capture device to track such objects.

Figure 9:
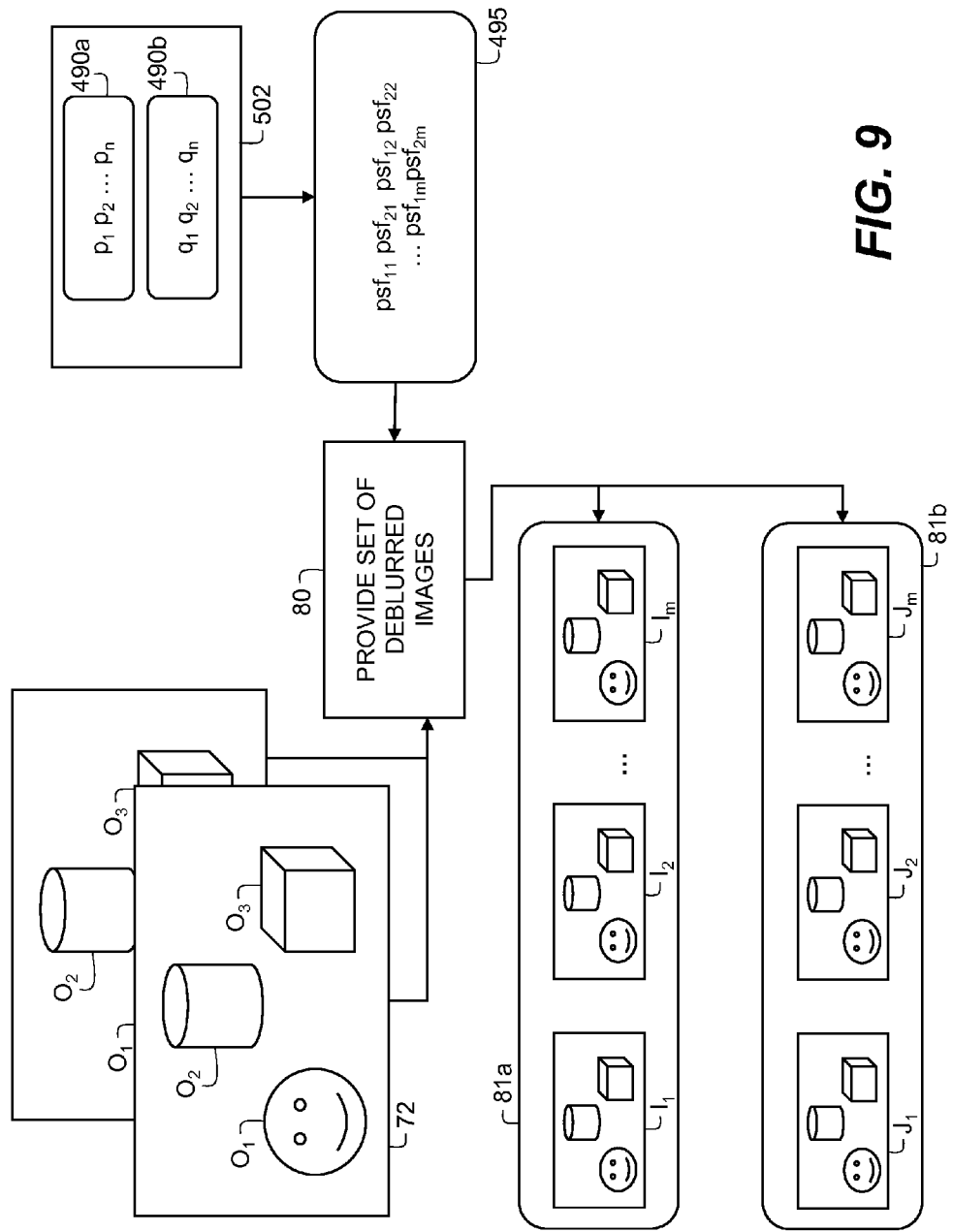
FIG. 9 is a process diagram illustrating a method for using a captured image and blur parameters to provide a set of deblurred images, according to one embodiment of the present invention.

FIG. 9 shows a process diagram in which a captured image pair 72, containing scene elements $O_1$, $O_2$ and $O_3$, taken at two magnifications, and blur parameters $[p_1, p_2, \ldots p_n]$ 490a and $[q_1, q_2, \ldots q_n]$ 490b stored in a memory 502, are used to provide 80 a set of deblurred images 81a and 81b. The blur parameters are a set of two dimensional matrices that approximate the psf of the image capture device 400 for the distance at which the image was captured, and a series of defocus distances covering the range of objects in the scene. Alternatively, the blur parameters are mathematical parameters from a regression or fitting function as described above. In either case, a digital representation of the point spread functions 495 that span the range of object distances of interest in the object space are computed from the blur parameters, resulting in the set $[psf_{11}, psf_{21}, \ldots psf_{1m} psf_{2m}]$ 495. Here the n,m subscripts refer to the $m^{th}$ range value for coded aperture n=1 or n=2. In the preferred embodiment, there is a one-to-one correspondence between the blur parameters 490a, 490b and the set of digitally represented psfs 495. In some embodiments, there is not a one-to-one correspondence. In some embodiments, digitally represented psfs at defocus distances for which blur parameter data has not been recorded is computed by interpolating or extrapolating blur parameter data from defocus distances for which blur parameter data is available. In the embodiment illustrated here, the sets of range values associated with the blur parameter data for the two magnifications are identical. In other embodiments, blur parameter data is obtained at sets of range values for the two magnifications that are partially coincident, overlapping but not coincident (i.e. interleaved), or covering disjoint intervals with different minimum and maximum range values.

The digitally represented psfs 495 are used in a deconvolution operation to provide two sets of deblurred images 80, the first deblurred image set 81a resulting from the first set of psf data, and the second deblurred image set 81b resulting from the second set of psf data. In the arrangement shown, each member of the captured image pair 72 is deconvolved m times, once for each of the corresponding m elements in the set 495, to create a set of 2m deblurred images, 81a and 81b. The deblurred image sets 81a and 81b, whose elements are denoted $[I_1, I_2, \ldots I_m]$ and $[J_1, J_2, \ldots J_m]$, are then further processed with reference to the original captured image pair 72, to determine the range information 90 for the objects in the scene.

Figure 10:
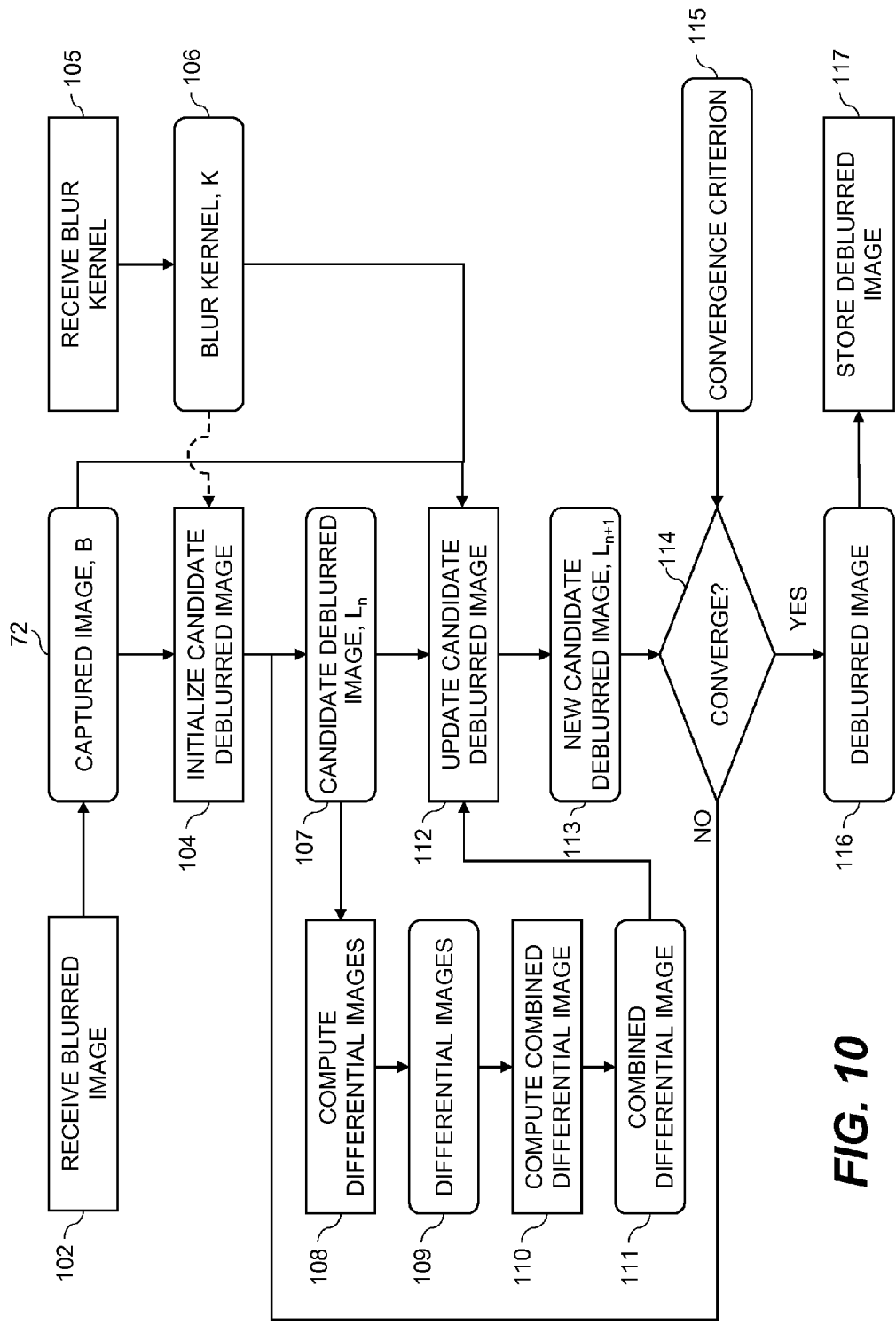
FIG. 10 is a process diagram illustrating a method for deblurring a single image according to one embodiment of the present invention.

The step of providing a set of deblurred images 80 will now be described in further detail with reference to FIG. 10, which illustrates the process of deblurring a single image using a single member of the set 495 of psfs in accordance with the present invention. As is known in the art, the image to be deblurred is referred to as the blurred image, and the psf representing the blurring effects of the camera system is referred to as the blur kernel. A receive blurred image step 102 is used to receive the one member of the captured image pair 72. Next a receive blur kernel step 105 is used to receive a blur kernel 106 which has been chosen from the set of psfs 495. The blur kernel 106 is a convolution kernel that is applied to a sharp image of the scene to produce an image having sharpness characteristics approximately equal to one or more objects within the captured image pair 72.

Next an initialize candidate deblurred image step 104 is used to initialize a candidate deblurred image 107 using one of the captured images 72. In a preferred embodiment of the present invention, the candidate deblurred image 107 is initialized by simply setting it equal to the captured image 72. Optionally, any deconvolution algorithm known to those in the art is used to process the captured image using the blur kernel 106, and the candidate deblurred image 107 is then initialized by setting it equal to the processed image. Examples of such deconvolution algorithms would include conventional frequency domain filtering algorithms such as the well-known Richardson-Lucy (RL) deconvolution method described in the background section. In other embodiments, where the captured image 72 is part of an image sequence, a difference image is computed between the current and previous image in the image sequence, and the candidate deblurred image is initialized with reference to this difference image. For example, if the difference between successive images in the sequence is currently small, the candidate deblurred image would not be reinitialized from its previous state, saving processing time. The reinitialization is saved until a significant difference in the sequence is detected. In other embodiments, only selected regions of the candidate deblurred image are reinitialized, if significant changes in the sequence are detected in only selected regions. In yet another embodiment, the range information is recomputed for only selected regions or objects in the scene where a significant difference in the sequence is detected, thus saving processing time.

Next a compute differential images step 108 is used to determine a plurality of differential images 109. The differential images 109 can include differential images computed by calculating numerical derivatives in different directions (e.g., x and y) and with different distance intervals (e.g., $\Delta x=1, 2, 3$). A compute combined differential image step 110 is used to form a combined differential image 111 by combining the differential images 109.

Next an update candidate deblurred image step 112 is used to compute a new candidate deblurred image 113 responsive to the blurred image, the blur kernel 106, the candidate deblurred image 107, and the combined differential image 111. As will be described in more detail later, in a preferred embodiment of the present invention, the update candidate deblurred image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 is specified in any appropriate way known to those skilled in the art. In a preferred embodiment of the present invention, the convergence criterion 115 specifies that the algorithm is terminated if the mean square difference between the new candidate deblurred image 113 and the candidate deblurred image 107 is less than a predetermined threshold. Alternate forms of convergence criteria are well known to those skilled in the art. As an example, the convergence criterion 115 is satisfied when the algorithm is repeated for a predetermined number of iterations. Alternatively, the convergence criterion 115 can specify that the algorithm is terminated if the mean square difference between the new candidate deblurred image 113 and the candidate deblurred image 107 is less than a predetermined threshold, but is terminated after the algorithm is repeated for a predetermined number of iterations even if the mean square difference condition is not satisfied.

If the convergence criterion 115 has not been satisfied, the candidate deblurred image 107 is updated to be equal to the new candidate deblurred image 113. If the convergence criterion 115 has been satisfied, a deblurred image 116 is set to be equal to the new candidate deblurred image 113. A store deblurred image step 117 is then used to store the resulting deblurred image 116 in a processor-accessible memory. The processor-accessible memory is any type of digital storage such as RAM or a hard disk.

In a preferred embodiment of the present invention, the deblurred image 116 is determined using a Bayesian inference method with Maximum-A-Posterior (MAP) estimation. Using the method, the deblurred image 116 is determined by defining an energy function of the form:

$$E(L)=(L\otimes K-B)^2+\lambda D(L) \quad (6)$$

where L is the deblurred image 116, K is the blur kernel 106, B is the blurred image, i.e. the captured image 72, $\otimes$ is the convolution operator, D(L) is the combined differential image 111 and $\lambda$ is a weighting coefficient In a preferred embodiment of the present invention the combined differential image 111 is computed using the following equation:

$$D(L) = \sum_j w_j (\partial_j L)^2 \quad (7)$$

where j is an index value, $\partial_j$ is a differential operator corresponding to the $j^{th}$ index, $w_j$ is a pixel-dependent weighting factor which will be described in more detail later.

Figure 11:
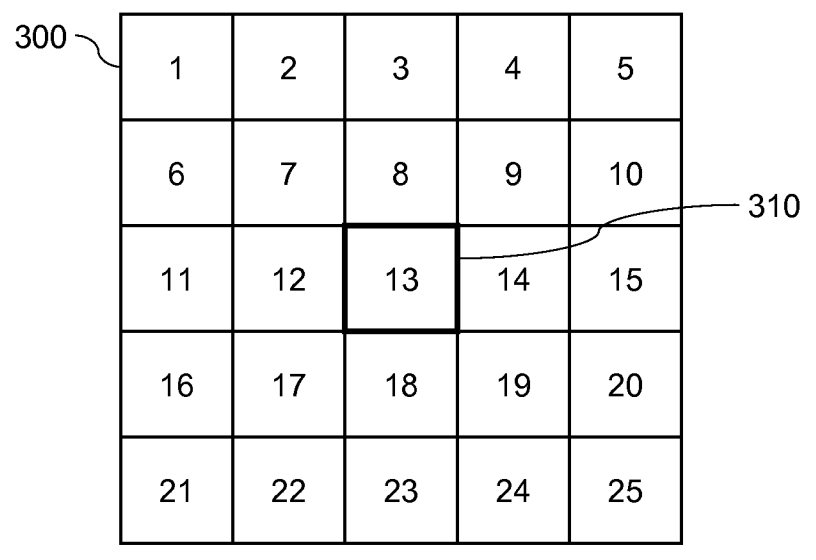

The index j is used to identify a neighboring pixel for the purpose of calculating a difference value. In a preferred embodiment of the present invention, difference values are calculated for a 5×5 window of pixels centered on a particular pixel. FIG. 11 shows an array of indices 300 centered on a current pixel location 310. The numbers shown in the array of indices 300 are the indices j. For example, an index value of j=6 corresponds to a top pixel that is 1 row above and 2 columns to the left of the current pixel location 310.

The differential operator $\partial_j$ determines a difference between the pixel value for the current pixel, and the pixel value located at the relative position specified by the index j. For example, $\partial_6 S$ would correspond to a differential image determined by taking the difference between each pixel in the deblurred image L with a corresponding pixel that is 1 row above and 2 columns to the In equation form this would be given by:

$$\partial_j L = L(x,y) - L(x-\Delta x_j, y-\Delta y_j) \quad (8)$$

where $\Delta x_j$ and $\Delta y_j$ are the column and row offsets corresponding to the $j^{th}$ index, respectively. It will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j = (w_d)_j (w_p)_j \quad (9)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \tag{10}$$

where $d = \sqrt{\Delta x_j^2 + \Delta y_j^2}$ is the distance between the pixels being differenced, and $G(\cdot)$ is weighting function. In a preferred embodiment, the weighting function $G(\cdot)$ falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al, it is desirable for the pixel-dependent weighting factor w to be determined using the equation:

$$(w_p)_j = |\partial_j L|^{\alpha - 2}. \tag{11}$$

where $|\cdot|$ is the absolute value operator and $\alpha$ is a constant (e.g., 0.8). During the optimization process, the set of differential images $\partial_j L$ is calculated for each iteration using the estimate of L determined for the previous iteration.

The first term in the energy function given in Eq. (6) is an image fidelity term. In the nomenclature of Bayesian inference, it is often referred to as a "likelihood" term. It is seen that this term will be small when there is a small difference between the blurred image (captured image 72) (B) and a blurred version of the candidate deblurred image (L) which as been convolved with the blur kernel 106 (K).

The second term in the energy function given in Eq. (6) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate deblurred image step 112 computes the new candidate deblurred image 113 by reducing the energy function given in Eq. (8) using optimization methods that are well known to those skilled in the art. In a preferred embodiment of the present invention, the optimization problem is formulated as a PDE given by:

$$\frac{\partial E(L)}{\partial L} = 0. \tag{12}$$

which is solved using conventional PDE solvers. In a preferred embodiment of the present invention, a PDE solver is used where the PDE is converted to a linear equation form that is solved using a conventional linear equation solver, such as a conjugate gradient algorithm. For more details on solving PDE solvers, refer to the aforementioned article by Levin et al. It should be noted that even though the combined differential image 111 is a function of the deblurred image L, it is held constant during the process of computing the new candidate deblurred image 113. Once the new candidate deblurred image 113 has been determined, it is used in the next iteration to determine an updated combined differential image 111.

Figure 12:
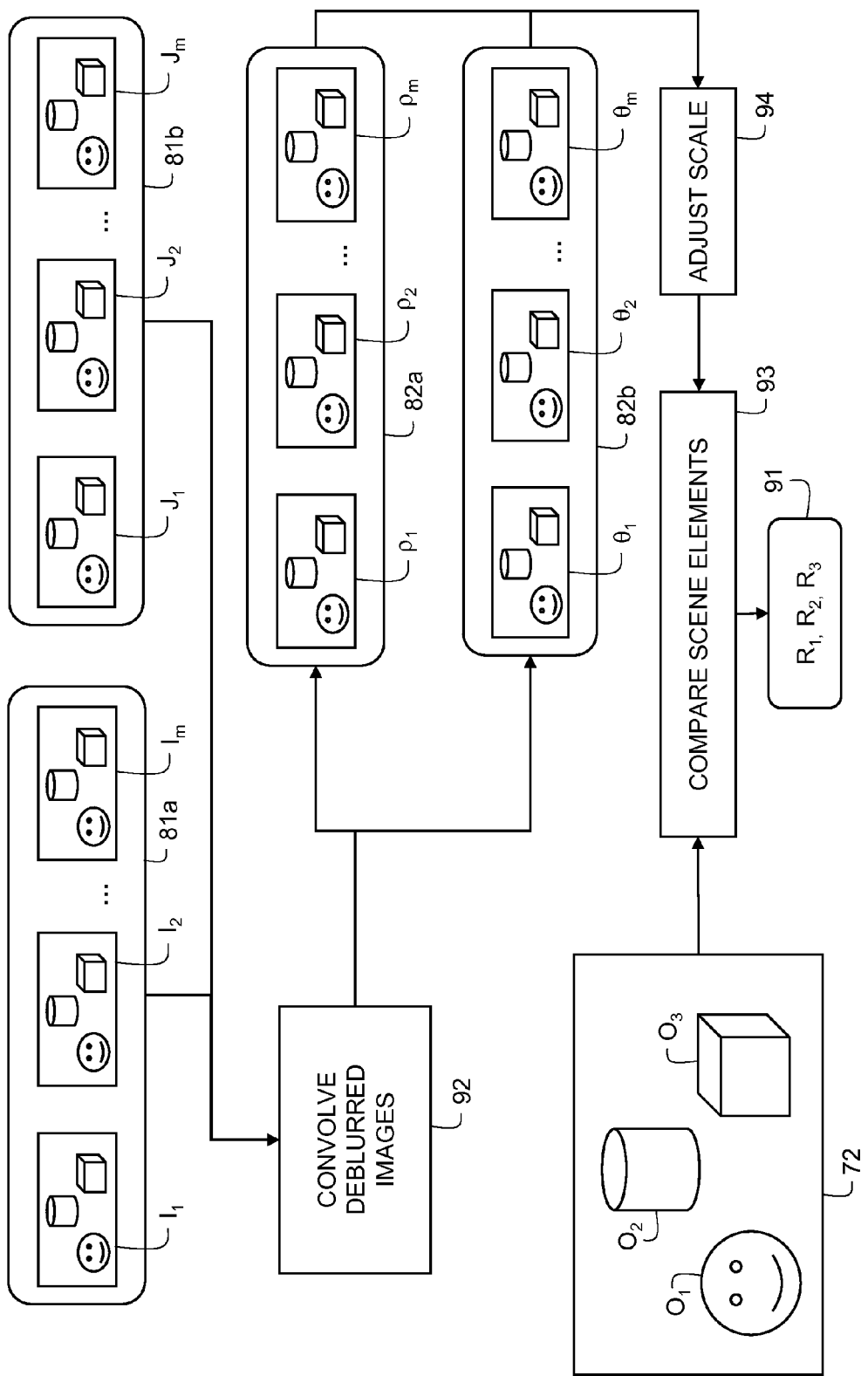
FIG. 12 is a process diagram illustrating a method for processing a deblurred image set to determine the range information for objects in a scene, according to one embodiment of the present invention.

FIG. 12 shows a process diagram in which the deblurred image sets 81a, 81b are processed to determine the range information 90 for the objects in the scene, in accord with an embodiment of the present invention. In this embodiment, each member of the deblurred image sets 81a, 81b is digitally convolved 92, using algorithms known in the art, with its corresponding member from the set of digitally represented psfs 495 in step 80. The result is two sets of reconstructed images 82a, 82b, whose elements are denoted $[\rho_1, \rho_2, \ldots \rho_m]$ and $[\theta_1, \theta_2, \ldots \theta_m]$. In theory, each reconstructed image should be an exact match for one of the original captured images 72 at the appropriate magnification, since the convolution operation is the inverse of the deblurring or deconvolution operation that was performed earlier. However, because the deconvolution operation is imperfect, no elements of the resulting reconstructed image set 82a, 82b are a perfect match for the captured image pair 72. Scene elements reconstruct with higher fidelity when processed with psfs corresponding to a distance that more closely matches the distance of the scene element relative to the plane of camera focus, whereas scene elements processed with psfs correspond to distances that differ from the distance of the scene element relative to the plane of camera focus, exhibit poor fidelity and noticeable artifacts. In the preferred embodiment, the scale of the reconstructed image set 82a, 82b is adjusted or normalized to the same magnification 94, for comparison with the first (pre-zoom) captured image. In the preferred embodiment, the first captured image is acquired at a magnification for which the zoom lens exhibits improved performance, and this is also chosen as the magnification to which the reconstructed images are scaled to for comparison. Since the reconstructed image set 82a was derived from the first capture, no resealing is required. Only the second reconstructed image set 82b requires resealing. After scale adjustment 94, by comparing 93 the reconstructed image sets with the scene elements in the captured image 72, range values 91 are assigned by finding the closest matches between the scene elements in the captured image 72 and the reconstructed versions of those elements in the adjusted reconstructed image sets. For example, scene elements $O_1$, $O_2$, and $O_3$ in the captured image 72 are compared 93 to their reconstructed and adjusted versions taken from elements $[\rho_1, \rho_2, \ldots \rho_m]$ and $[\theta_1, \theta_2, \ldots \theta_m]$ of the reconstructed image sets 82a, 82b, and assigned range values 91 of $R_1$, $R_2$, and $R_3$ that correspond to the psfs that yield the closest matches.

Figure 13:
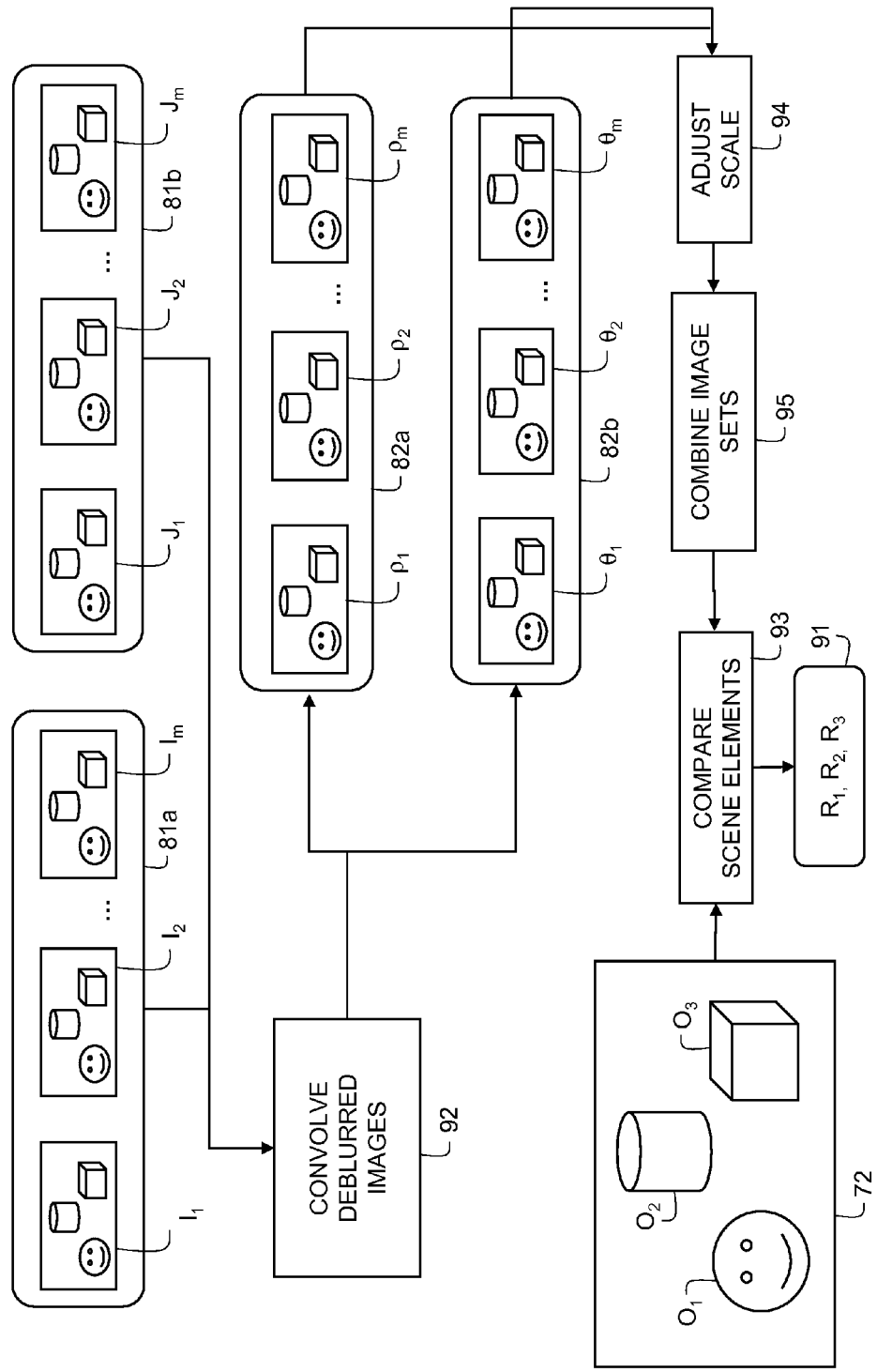
FIG. 13 is a process diagram illustrating a method for processing a deblurred image set to determine the range information for objects in a scene, according to another embodiment of the present invention.

In a preferred embodiment of the present invention, the deblurred and reconstructed image sets 82a, 82b are combined before comparison with the captured image 72 and assignment of range values. FIG. 13 shows this process, wherein the reconstructed image sets 82a, 82b are scaled 94, as described previously, and combined 95, followed by comparison 93 of the scene elements in each image set with those of the first captured image 72. Combining the reconstructed image sets 82a, 82b resulting from the deblurred image sets 81a, 81b is defined as the creation of a new image set (post scale adjustment in step 94) in which each member is a weighted sum of the corresponding elements of the original sets 82a, 82b, i.e. those set elements corresponding to the same range value. This is written mathematically as:

$$\hat{i}_{comb} = \{w_1\rho_1(x,y) + w_2\theta_1(x,y); w_1\rho_2(x,y) + w_2\theta_2(x,y); \ldots w_1\rho_m(x,y) + w_2\theta_m(x,y)\} \tag{13}$$

where $w_k$, k=1,2 are the weighting factors and $w_1 + w_2 = 1$. As explained with reference to FIGS. 7a-7d, the advantage of this method is that the two captures at the two different magnifications represent different spatial frequency filtrations of each scene object's frequency content. Therefore, the two captures do not produce the same reconstruction artifacts, and the artifacts are at least partially averaged out in the combination step 95, as defined in Eq. (13). This leads to a more robust determination of the range of each scene element in step 93. In other arrangements, the weighting factors $w_k$, in Eq. (13) are shown to be the same for each range value, vary between range values, subject to the constraint that $w_1 + w_2 = 1$ for each range value. The weighting factors $w_k$ are predetermined to produce a combined image set with reduced reconstruction artifacts, and depend on the choice of coded apertures. This is accomplished through experimentation, or through optimization techniques known in the art.

In another arrangement, the reconstructed image sets 82a, 82b are combined in the Fourier domain, and the inverse Fourier transform is taken (again, post scale adjustment in step 94). In yet another arrangement, the combination is performed in the Fourier domain using a spatial frequency dependent weighting criterion. This is computed using an expression such as:

$$\hat{I}_{comb} = \begin{Bmatrix} w_1(v_x, v_y)\hat{\rho}_1(v_x, v_y) + w_2(v_x, v_y)\hat{\theta}_1(v_x, v_y); \\ w_1(v_x, v_y)\hat{\rho}_2(v_x, v_y) + w_2(v_x, v_y)\hat{\theta}_2(v_x, v_y); \ldots \\ w_1(v_x, v_y)\hat{\rho}_m(v_x, v_y) + w_2(v_x, v_y)\hat{\theta}_m(v_x, v_y) \end{Bmatrix} \quad (14)$$

where $\hat{\rho}(v_x,v_y)$ and $\hat{\theta}(v_x,v_y)$ denote the Fourier transforms of $\sigma(x, y)$ and $\theta(x, y)$, respectively. The advantage of this method is that the two sets of captures are weighted to have the most influence at spatial frequencies where each aperture has a high signal-to-noise ratio, such as away from zeroes in its Fourier response, which reduces reconstruction artifacts and produces more robust range estimates. In this arrangement, the weighting functions $w_1(v_x, v_y)$ and $w_2(v_x, v_y)$ obey the constraint $w_1(0,0)+w_2(0,0)=1$ for each range value, in order to avoid changes in the overall brightness of the images. Once again, the weighting factors $w_1(v_x, v_y)$ and $w^2(v_x, v_y)$ are predetermined to produce a combined image set with reduced reconstruction artifacts, and depend on the choice of coded aperture and magnification. This is accomplished through experimentation, or through optimization techniques known in the art. In this arrangement, the optimization should take into account the spatial frequency dependence of the weighting factors.

The deblurred image sets 81a, 81b are intentionally limited by using a subset of blur parameters from the stored set. This is done for a variety of reasons, such as reducing the processing time to arrive at the range values 91, or to take advantage of other information from the capture device 400 indicating that the full range of blur parameters is not necessary. The set of blur parameters used (and hence the deblurred image sets 81a, 81b created) is limited in increment (i.e. subsampled) or extent (i.e. restricted in range). Returning to FIG. 12, the subset of blur parameters chosen can or cannot be identical for the two magnifications. If not identical, this implies that there will not be a one-to-one correspondence between images in the reconstructed image sets 82a and 82b for all, or any, range values. In some arrangements, the two magnifications are used to provide range estimates at range values which are interleaved. In other arrangements, the two magnifications are used to provide range estimates at range values over disjoint intervals. If a digital image sequence is processed, the set of blur parameters used is the same, or different for each image in the sequence.

Alternatively, instead of subletting or subsampling the blur parameters from the stored set, reduced sets of deblurred images are created by combining images corresponding to range values within selected range intervals. This might be done to improve the precision of depth estimates in a highly textured or highly complex scene which is difficult to segment. For example, let $z_m$, where $m=1, 2, \ldots M$ denote the set of range values at which the blur parameters [$p_1, p_2, \ldots p_m$] and [$q_1, q_2, \ldots q_m$] have been measured. Let $\hat{i}_m(x, y)$ denote the deblurred image corresponding to range value m and blur parameters $p_m$, and let $\hat{j}_m(x, y)$ denote the deblurred image corresponding to range value m and blur parameters $q_m$. Further, let $\hat{I}_m(v_x, v_y)$ and $\hat{J}_m(v_x, v_y)$ denote their Fourier transforms. If the range values are divided into M equal groups or intervals, each containing M range values, reduced deblurred image sets is defined as follows:

$$\hat{i}_{red} = \left\{ \frac{1}{N}\sum_{m=1}^{N} \hat{i}_m(x, y); \frac{1}{N}\sum_{m=N+1}^{2N} \hat{i}_m(x, y); \right. \\ \left. \frac{1}{N}\sum_{m=2N+1}^{3N} \hat{i}_m(x, y); \ldots \frac{1}{N}\sum_{m=(N/M)-N}^{N/M} \hat{i}_m(x, y); \right\} \quad (15)$$

$$\hat{j}_{red} = \left\{ \frac{1}{N}\sum_{m=1}^{N} \hat{j}_m(x, y); \frac{1}{N}\sum_{m=N+1}^{2N} \hat{j}_m(x, y); \right. \\ \left. \frac{1}{N}\sum_{m=2N+1}^{3N} \hat{j}_m(x, y); \ldots \frac{1}{N}\sum_{m=(N\cdot M)-N}^{N/M} \hat{j}_m(x, y); \right\} \quad (16)$$

In other arrangements, the range values are divided into M unequal groups, whereas in other arrangements, a different number of groups is associated with each coded aperture. In yet another arrangement, a reduced blurred image set is defined using a spatial frequency dependent weighting criterion via the following equation:

$$\hat{i}_{red} = \left\{ \frac{1}{N}\sum_{m=1}^{N} w(v_x, v_y)\hat{I}_m(v_x, v_y); \frac{1}{N}\sum_{m=N+1}^{2N} w(v_x, v_y)\hat{I}_m(v_x, v_y); \right. \\ \left. \ldots \frac{1}{N}\sum_{m=(N/M)-N}^{N/M} w(v_x, v_y)\hat{I}_m(v_x, v_y); \right\} \quad (17)$$

$$\hat{j}_{red} = \left\{ \frac{1}{N}\sum_{m=1}^{N} w(v_x, v_y)\hat{J}_m(v_x, v_y); \frac{1}{N}\sum_{m=N+1}^{2N} w(v_x, v_y) \right. \\ \left. \hat{J}_m(v_x, v_y); \ldots \frac{1}{N}\sum_{m=(N/M)-N}^{N/M} w(v_x, v_y)\hat{J}_m(v_x, v_y); \right\} \quad (18)$$

where $w(v_x,v_y)$ is a spatial frequency weighting function. Such a weighting function is useful, for example, in emphasizing spatial frequency intervals where the signal-to-noise ratio is most favorable, or where the spatial frequencies are most visible to the human observer. In some embodiments, the spatial frequency weighting function is the same for each of the M range intervals, however, in other embodiments the spatial frequency weighting function is different for some or all of the intervals. In other arrangements, the spatial frequency weighting function is different for the two magnifications.

Figure 14:
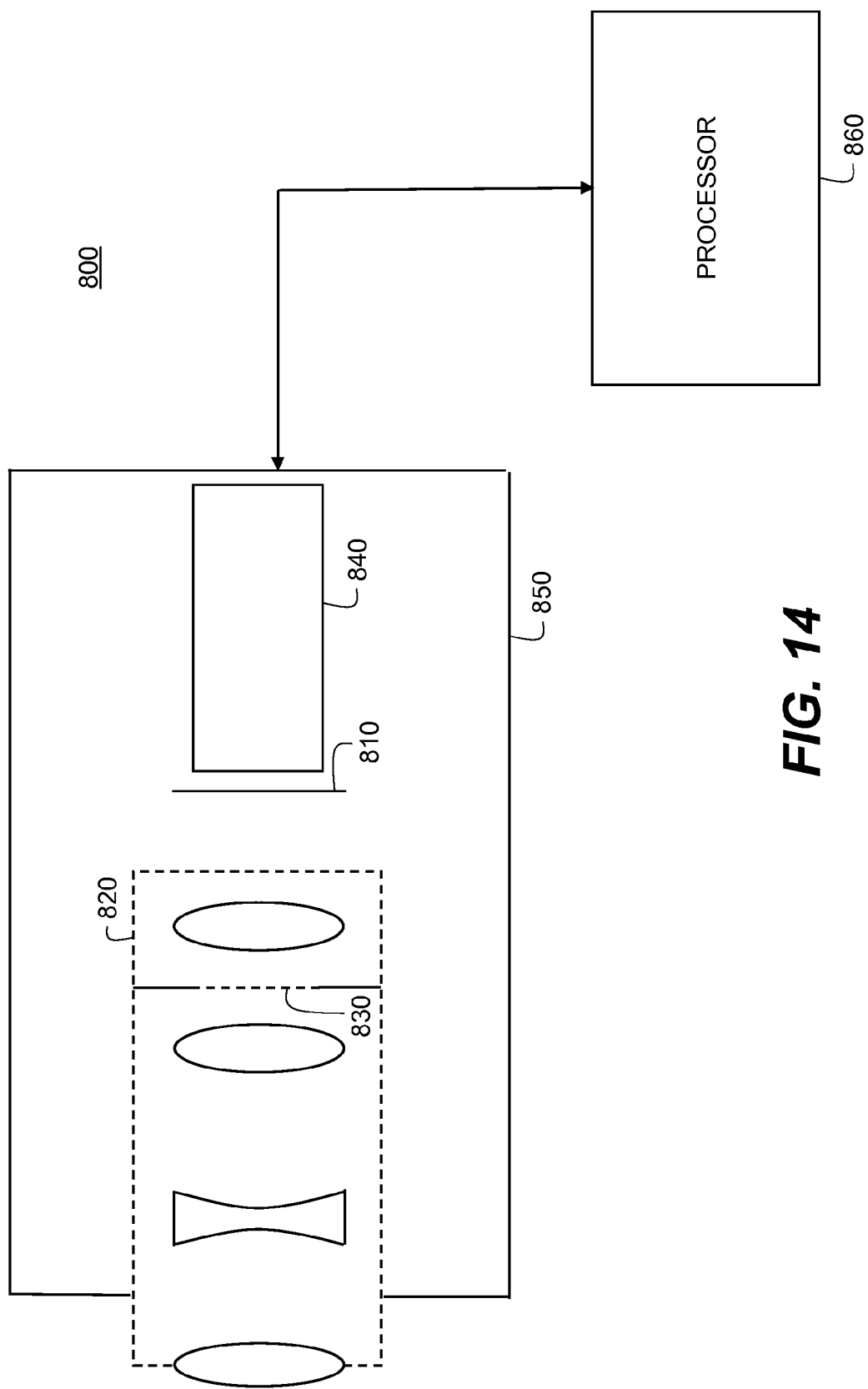
FIG. 14 is a schematic of a digital camera system according to one embodiment of the present invention.

FIG. 14 is a schematic of a digital camera system 800 in accordance with the present invention. The digital camera system 800 includes an image sensor 810 for capturing one or more images of a scene, a zoom lens 820 for imaging the scene onto the sensor, a coded aperture 830, and a processor-accessible memory 840 for storing a set of blur parameters derived from range calibration data for each coded aperture 830, all inside an enclosure 850, and a data processing system 860 in communication with the other components, for providing a set of deblurred images using the captured images and each of the blur parameters from the stored set, and for using the set of deblurred images to determine the range information for the objects in the scene. The data processing system 860 is a programmable digital computer that executes the steps previously described for providing a set of deblurred images using captured images and each of the blur parameters from the stored set. In other arrangements, the data processing system 860 is inside the enclosure 850, in the form of a small dedicated processor.

The invention has been described in detail with particular reference to certain preferred embodiments thereof, but it will be understood that variations and modifications can be effected within the spirit and scope of the invention.

PARTS LIST $s_1$ Distance
$s_2$ Distance
$s_1'$ Distance
$s_2'$ Image Distance
$P_1$ On-Axis Point
$P_2$ On-Axis Point
$P_1'$ Image Point
$P_2'$ Image Point
D Diameter
d Distance
F Focal Plane
$R_0$ Object Distance
$D_1$ Planes
$D_2$ Planes
$O_1, O_2, O_3$ Scene Elements
$\rho_1, \rho_2, \ldots \rho_m$ Reconstructed Image Elements
$\theta_1, \theta_2, \ldots \theta_m$ Reconstructed Image Elements
$I_1, I_2, \ldots I_m$ Image Set Member.
$J_1, J_2, \ldots J_m$ Image Set Member
10 Lens
20 Axial ray
22 Axial ray
24 Axial ray
26 Axial ray
30 Lens
32 Binary transmittance mask
34 Lens
40 Focusing unit
41 Variator
42 Compensator
43 Aperture stop
44 Prime lens
45 Image plan
46 Variator compensator joint group
47 Central lens element
50 Provide image capture device step
60 Store blur parameters step
70 Capture image step
72 Captured image pair
80 Provide set of deblurred images step
81a Deblurred image set
81b Deblurred image set
82a Reconstructed image set
82b Reconstructed image set
90 Determine range information step
91 Range value
92 Convolve deblurred images step
93 Compare scene elements step
94 Adjust scale step
95 Combine reconstructed image sets step
102 Receive blurred image step
104 Initialize candidate deblurred image step
105 Receive blur kernel step
106 Blur kernel
107 Candidate deblurred image
108 Compute differential images step
109 Differential images
110 Compute combined differential image step
111 Combined differential image
112 Update candidate deblurred image step
113 New candidate deblurred image
114 Convergence test
115 Convergence criterion
116 Deblurred image.
117 Store deblurred image step
200 Light source
210 Condenser optics
220 Light ray
230 Light ray
300 Array of indices
310 Current pixel location
400 Digital capture device
410 Focus lens
420 Variator
430 Compensator
440 Coded Aperture Plate
450 Coded Aperture
460 Prime lens
470 Zoom lens system
480 Electronic sensor array
490a Blur parameters (first magnification)
490b Blur parameters (second magnification)
495 Point spread functions (digital representation)
500 Capture Device MTF
502 Memory
510 Capture device MTF
520 Capture device MTF
530 Capture device MTF
600 Curve showing scene spectrum after capture
610 Reference line
620 Curve showing scene spectrum prior to capture
630 Reference line
800 Digital camera system
810 Image sensor
820 Zoom lens system
830 Coded aperture
840 Memory
850 Enclosure
860 Processor

The invention claimed is:

1. A method of using an image capture device to identify range information for objects in a scene, comprising:
   a) providing an image capture device having at least one image sensor, a lens and a coded aperture;
   b) storing in a memory a set of blur kernels derived from range calibration data for the coded aperture;
   c) capturing a first and second image of the scene having a plurality of objects, corresponding to first and second optical magnifications, respectively, wherein the image capture device has a different spatial frequency response at the first and second optical magnifications;
   d) providing a set of deblurred images using the capture images from each magnification and each of the blur kernels from the stored set; and
   e) using the set of deblurred images to determine the range information for the objects in the scene.

2. The method of claim 1 wherein step d) includes for each deblurred image
   i) initializing a candidate deblurred image;
   ii) determining a plurality of differential images representing differences between neighboring pixels in the candidate deblurred image, including a range of at least 1 or more pixels in size and including vertical, horizontal and diagonal directions;

iii) determining a combined differential image by combining the differential images;

iv) updating the candidate deblurred image responsive to the captured image, the blur kernels, the candidate deblurred image and the combined differential image; and v) repeating steps i)-iv) until a convergence criterion is satisfied.

3. The method of claim 1, wherein step c) includes capturing first and second image sequences, corresponding to the first and second optical magnifications, respectively.

4. The method of claim 3, wherein step e) includes determining range information for each image in the sequence.

5. The method of claim 4, wherein range information is determined for a subset of images in the sequence.

6. The method of claim 4, wherein the range information is used to identify stationary and moving objects in the scene.

7. The method of claim 6, wherein the range information is used by the image capture device to track moving objects.

8. The method of claim 3, wherein the step of initializing a candidate deblurred image includes:
a) determining a difference image between the current and previous image in the image sequence; and
b) initializing a candidate deblurred image responsive to the difference image.

9. The method of claim 8, further including determining range information for the objects in the scene, responsive to the difference image.

10. The method of claim 1, wherein step d) includes using a subset of blur kernels from the stored set.

11. The method of claim 1, wherein step b) includes using a set of blur parameters derived from calibration data at a set of range values, such that there is a set of blur parameters for each optical magnification at each corresponding range value.

12. The method of claim 1, wherein step b) includes storing a subset of blur parameters derived from calibration data at a set of range values, responsive to information provided by the capture device.

13. The method of claim 1, wherein step e) includes combining the deblurred images according to a spatial-frequency dependent weighting criterion.

14. The method of claim 1, wherein step e) includes combining deblurred images resulting from blur parameters corresponding to each optical magnification within selected range intervals.

15. The method of claim 14, further including combining the deblurred images according to a spatial-frequency dependent weighting criterion.

16. A digital camera system comprising:
a) an image sensor for capturing one or more images of a scene;
b) a zoom lens for imaging the scene onto the image sensor at first and second optical magnifications, wherein the image has a different spatial frequency response at first and second optical magnifications;
c) a coded aperture;
d) a processor-accessible memory for storing a set of blur parameters derived from range calibration data; and
e) a data processing system for providing a set of deblurred images using captured images and each of the blur parameters from the stored set by, i) initializing a candidate deblurred image;

ii) determining a plurality of differential images representing differences between neighboring pixels in the candidate deblurred image, including a range of at least 1 or more pixels in size and including vertical, horizontal and diagonal directions;

iii) determining a combined differential image by combining the differential images;

iv) updating the candidate deblurred image responsive to the captured image, the blur kernel, the candidate deblurred image and the combined differential image;

v) repeating steps i)-iv) until a convergence criterion is satisfied; and vi) using the set of deblurred images to determine the range information for the objects in the scene.

17. A method of using an image capture device to identify range information for objects in a scene, comprising:
a) providing an image capture device having at least one image sensor, a lens and a coded aperture;
b) storing in a memory a set of blur kernels derived from range calibration data for the coded aperture, using a set of blur parameters derived from calibration data at a set of range values, wherein there is a set of blur parameters for each optical magnification at each corresponding range value, and wherein the sets of blur parameters corresponding to each optical magnification are associated with overlapping range intervals;
c) capturing a first and second image of the scene having a plurality of objects, corresponding to first and second optical magnifications, respectively, wherein the scene's spatial frequency content is filtered by the image capture device's frequency response at a different scale at the two different magnifications;
d) providing a set of deblurred images using the capture images from each magnification and each of the blur kernels from the stored set; and
e) using the set of deblurred images to determine the range information for the objects in the scene.

18. A method of using an image capture device to identify range information for objects in a scene, comprising:
a) providing an image capture device having at least one image sensor, a lens and a coded aperture;
b) storing in a memory a set of blur kernels derived from range calibration data for the coded aperture, using a set of blur parameters derived from calibration data at a set of range values, wherein there is a set of blur parameters for each optical magnification at each corresponding range value, and wherein the sets of blur parameters corresponding to each optical magnification are associated with non-overlapping range intervals;
c) capturing a first and second image of the scene having a plurality of objects, corresponding to first and second optical magnifications, respectively, wherein the scene's spatial frequency content is filtered by the image capture device's frequency response at a different scale at the two different magnifications;
d) providing a set of deblurred images using the capture images from each magnification and each of the blur kernels from the stored set; and
e) using the set of deblurred images to determine the range information for the objects in the scene.

* * * * *